United States Patent

Yamamoto et al.

Patent Number: 5,502,589
Date of Patent: Mar. 26, 1996

[54] OPTICAL COMMUNICATION SYSTEMS AND OPTICAL NODES FOR USE THEREIN

[75] Inventors: Noboru Yamamoto, Fujisawa; Kenji Nakamura, Hadano; Masao Majima, Atsugi, all of Japan

[73] Assignee: Canon Kabushiki Kaisha, Tokyo, Japan

[21] Appl. No.: 465,575

[22] Filed: Jun. 5, 1995

Related U.S. Application Data

[63] Continuation of Ser. No. 159,108, Nov. 30, 1993, abandoned, which is a continuation of Ser. No. 759,923, Sep. 13, 1991, abandoned.

[30] Foreign Application Priority Data

Sep. 17, 1990 [JP] Japan ................................ 2-246657

[51] Int. Cl.⁶ .................................................. H04B 10/02
[52] U.S. Cl. ......................... 359/174; 359/176; 359/110
[58] Field of Search ....................................... 359/110, 118, 359/174, 175, 176, 177, 179; 375/3; 455/246.1, 247.1

[56] References Cited

U.S. PATENT DOCUMENTS

| | | | |
|---|---|---|---|
| 3,887,876 | 6/1975 | Zeidler | 359/174 |
| 3,943,358 | 3/1976 | Reymond et al. | 250/199 |
| 4,435,849 | 3/1984 | Ilgner et al. | 359/177 |
| 4,731,784 | 3/1988 | Keller et al. | 359/119 |
| 4,829,593 | 5/1989 | Hara | 455/247.1 |
| 4,947,134 | 8/1990 | Olsson | 359/174 |
| 4,958,354 | 9/1990 | Urakami et al. | 359/174 |
| 5,080,505 | 1/1992 | Epworth | 359/174 |
| 5,117,196 | 5/1992 | Epworth et al. | 359/174 |
| 5,296,957 | 3/1994 | Takahashi et al. | 359/177 |

FOREIGN PATENT DOCUMENTS

| | | | |
|---|---|---|---|
| 3007958 | 9/1981 | France | H04B 10/16 |
| 2255683 | 11/1992 | United Kingdom | 359/179 |

Primary Examiner—Leo Boudreau
Assistant Examiner—Rafael Bacares
Attorney, Agent, or Firm—Fitzpatrick, Cella, Harper & Scinto

[57] ABSTRACT

An optical communication network includes at least one optical transmission path, a plurality of terminals connected to the optical transmission path, a plurality of optical nodes for receiving and transmitting an optical signal between the optical transmission path and the terminals, and a controller for controlling the intensity of a signal output from each optical node so as equalize its intensity with the intensity of a signal input to each optical node from the optical transmission path. In this optical communication network, the loss of a signal's intensity is determined solely by the total extension length of the optical transmission path, so that the optical modes can be freely re-connected in the network.

8 Claims, 6 Drawing Sheets

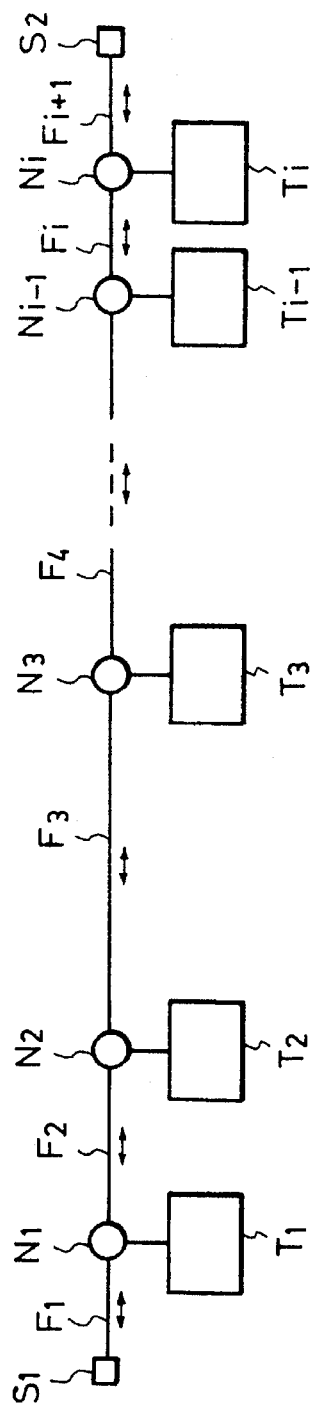
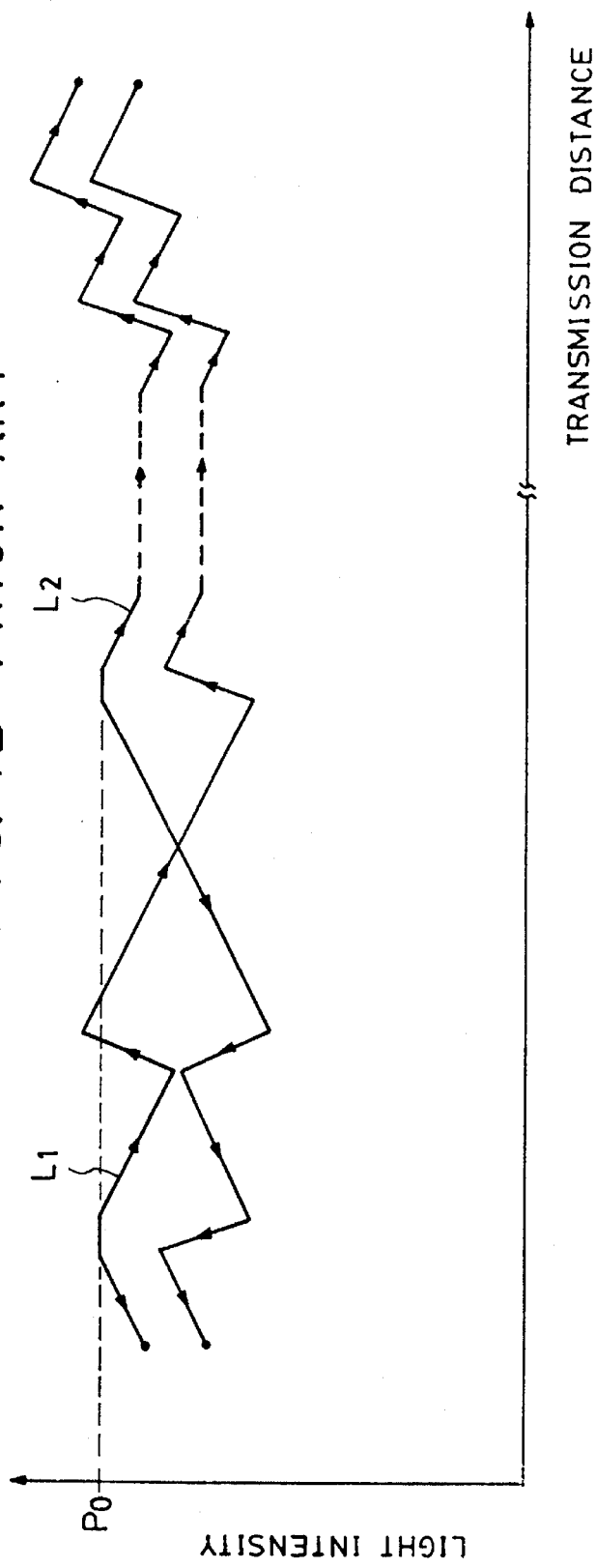

OPTICAL COMMUNICATION SYSTEMS AND OPTICAL NODES FOR USE THEREIN

This application is a continuation of application Ser. No. 08/159,108, filed Nov. 30, 1993, which is a continuation of application Ser. No. 07/759,923, filed Sep. 13, 1991, now both abandoned.

BACKGROUND OF THE INVENTION

1. Field of the Invention

The present invention relates to an optical communication system or network and an optical node for use therein, and, more particularly, to an optical communication system, typically, of a bus type in which the amplification gain of an optical amplifier in each terminal is controlled in a predetermined manner and an optical node to be used therein.

2. Related Background Art

In recent years attention has been paid to a bus type of optical communication network for its advantageous features. In the bus type of optical communication network, an optical signal transmitted through an optical fiber is transmitted through each terminal connected to the optical fiber without being converted to an electric signal, and in each terminal a means for effecting optical branching and optical combining which is called an optical node is connected to the optical fiber and performs reception and transmission of signals from and to the optical fiber.

When the optical signal is branched in the optical node, the intensity of the optical signal transmitted through the optical fiber is reduced. So, previously the number of terminals that could be connected to the optical fiber was limited, and hence the bus type of optical communication network was believed impractical. However, recently, a means for amplifying the optical signal without converting this to an electric signal, such as a semiconductor optical amplifier and a fiber optical amplifier, has been developed, so it has become possible to increase the number of terminals to be connected to the optical fiber.

Further, while the communication distance of the bus type system cannot be made too long due to the signal delay on a transmission path, the bus type system has an advantage that the terminal connection to the optical fiber can easily be modified. So, the bus type system is suitable for a local area network in which the total transmission distance length is about several kilometers and in which flexibility to re-connect the terminals is desired.

FIGS. 1A and 1B respectively show a schematic structure of such a prior art bus type of an optical communication network and intensities of optical signals on its optical fiber transmission path.

In FIG. 1A, there are provided optical fibers $F_1 - F_{i+1}$, terminals $T_1 - T_i$, optical nodes $N_1 - N_i$ and end equipment $S_1$ and $S_2$ for preventing reflections of an optical signal at optical fiber ends. The optical nodes respectively have functions that the electric signals from the terminals $T_1 - T_i$ are converted into optical signals to be transmitted to the optical fibers $F_1 - F_{i+1}$, that parts of the optical signals on the optical fibers $F_1 - F_{i+1}$ are picked out to be converted into electric signals for transmission to the terminals $T_1 - T_i$, and that the optical signals on the optical fibers $F_1 F_{i+1}$ are amplified to be transmitted to adjacent optical fibers. In FIG. 1B, a line $L_1$ indicates that an optical signal output from the optical node $N_1$ is attenuated on the optical fibers $F - F_{i+1}$ and that such optical signal is amplified by other optical nodes (i.e., the intensity of the optical signal output from the node $N_1$), and a line $L_2$ indicates the intensity of an optical signal output from the optical node $N_3$.

In the prior art of FIGS. 1A and 1B, the amplification factors of the optical signal at respective nodes $N_1 - N_i$ are equal to one another.

For example, as shown in FIG. 1B, the signal from the terminal $T_1$ is converted into the optical signal by the optical node $N_1$ and output to the optical fibers $F_1$ and $F_2$. The optical signal transmitted to the optical fiber $F_1$ is absorbed by the end equipment $S_1$. On the other hand, the optical signal transmitted to the optical fiber $F_2$ is reduced by an attenuation amount determined by the length of the optical fiber $F_2$ and enters the optical node $N_2$. The optical node $N_2$ picks out part of the incident signal to convert this into an electric signal and transmits this part to the terminal $T_2$. At the same time, the node $N_2$ amplifies the remaining part of the incident signal a predetermined gain and transmits this to the optical fiber $F_3$. This optical signal is transmitted by being repeatedly processed in this manner and reaches the end equipment $S_2$ after passing through the other optical nodes.

The signal from the terminal $T_3$ is converted into an electric signal in the optical node $N_3$ and is transmitted to two adjacent optical fibers $F_3$ and $F_4$ to finally reach respective end equipment $S_1$ and $S_2$ by the same process as described above.

Although the signals from plural terminals $T_1 - T_i$ cannot simultaneously be transmitted using a common wavelength, practically simultaneous communications can be achieved among plural terminals using a proper access method. Such methods includes a method wherein the signal transmission from a certain terminal is started after the confirmation that no signals are transmitted from the other terminals (called carrier sense multiple access (CSMA)), a method wherein the signal transmission is conducted during a time slot allotted to each individual terminal (called time division multiplexing access (TDMA)), and a method wherein a signal is transmitted from each individual terminal using light whose wavelength is different from those of the other terminals (called wavelength division multiplexing (WDM)).

The prior art system of FIG. 1A, however, has the following drawback.

In this system, the gain value of each node is beforehand determined, as mentioned above. So, if those predetermined gain values are set equal to one another, it would be impossible to freely select the distance between the nodes. In other words, where the distance between nodes is shortened to obtain a multistage connection, intensity of a transmitted optical signal may amount to the saturation level of an optical amplifier used in the optical node. As a result, the signal distortion increases and hence the error rate at the time of transmission may be enhanced.

On the other hand, when the optical communication network is assembled, where the gain of each individual optical node is independently determined so as to prevent the above-discussed saturation, the saturation and shortage of the optical signal may occur in turn if the connection configuration of the optical communication network is altered and hence the distance between the nodes is changed. The reason therefor is that the gain is set to a small value in such an optical node having a short distance to an adjacent optical node while set to a large value in an optical node having a long distance to an adjacent node.

Therefore, the feature of a bus-type optical communication network having a flexible change in the connection configuration is not possible.

SUMMARY OF THE INVENTION

An object of the present invention is to provide an optical communication network which is structured so as not to cause any inconveniences even if optical nodes are flexibly re-connected.

Another object of the present invention is to provide an optical node which is suitable for use in the optical communication network mentioned above.

A further object of the present invention is to provide an optical repeating method for equalizing an output from an optical node with an input to the optical node.

According to one aspect of the present invention, an optical communication network comprises at least one optical transmission path, a plurality of terminals connected to the optical transmission path, optical nodes for receiving and transmitting an optical signal between the optical transmission path and the terminals, and means for controlling an intensity of a signal output from each optical node so as to equalize its intensity with that of a signal input to each optical node from the optical transmission path.

According to another aspect of the present invention, an optical node to be used in an optical communication network comprises means for receiving and transmitting an optical signal between an optical transmission path and a plurality of terminals connected thereto, and means for controlling an intensity of a signal output from the receiving and transmitting means so as to equalize its intensity with the intensity of a signal input to the receiving and transmitting means from the optical transmission path.

According to a further aspect of the present, an optical repeating method comprises the steps of first monitoring the intensity of a signal input to an optical node, secondly monitoring the intensity of a signal output from the optical node, amplifying the input signal, and controlling a gain of the amplifying step based on the intensity of the input and output signals obtained in the first and second monitoring steps.

These advantages and others will be more readily understood in connection with the following detailed description of the preferred embodiment in conjunction with the drawings.

BRIEF DESCRIPTION OF THE DRAWINGS

FIG. 1A is a view showing a structure of a prior art bus-type optical communication network.

FIG. 1B is a representation illustrating the intensity of an optical signal on an optical transmission path in FIG. 1A.

DESCRIPTION OF THE PREFERRED EMBODIMENT

Figure 2A:
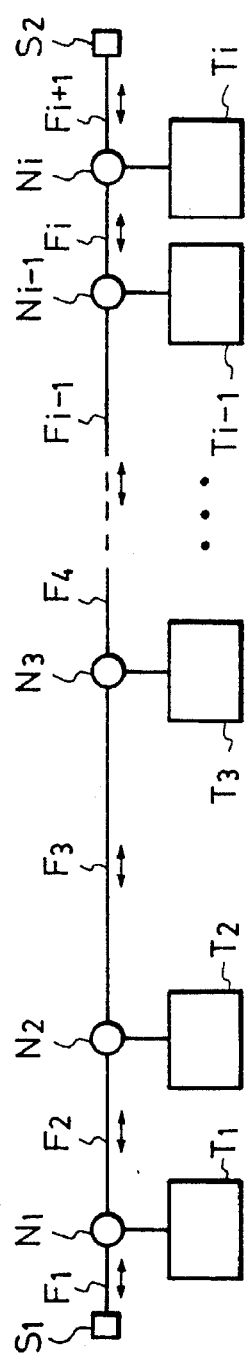
FIG. 2A is a view showing a structure of a first embodiment according to the present invention.
Figure 2B:
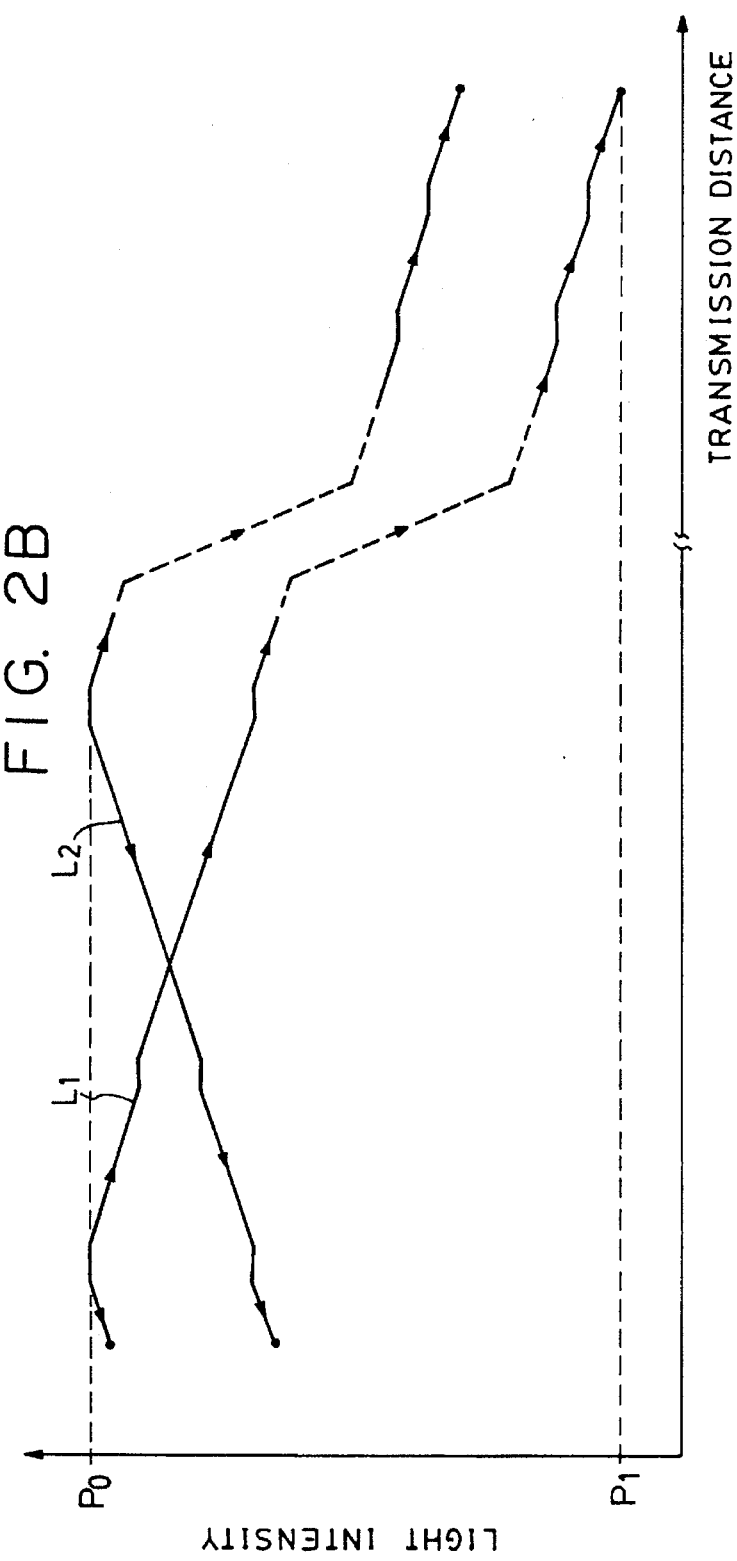
FIG. 2B is a representation illustrating the intensity of an optical signal on an optical transmission path in FIG. 2A.

FIG. 2A shows the first embodiment of this invention, and FIG. 2B illustrates the intensity of an optical communication signal at each point in the network shown in FIG. 2A.

Each of the elements shown in block outline in FIG. 2A as well as in FIGS. 1A and 3 through 5, is well known per se, and its specific type or construction is not critical to carrying out the invention or to a disclosure of the best mode for carrying ont the invention.

In FIG. 2A, there are provided terminals $T_1, \ldots, T_i$, optical fiber transmission paths $F_1, \ldots, F_{i+1}$, and optical nodes $N_1, \ldots, N_i$. The functions of each optical node are basically the same as those explained above referring to FIG. 1A. End equipment $S_1$ and $S_2$ are also the same as those explained above.

In FIG. 2B, a line $L_1$ indicates the intensity of an optical signal transmitted from the terminal $T_1$ shown in FIG. 2A through the optical node $N_1$, and a line $L_2$ indicates the intensity of the same from another terminal $T_3$.

Figure 3:
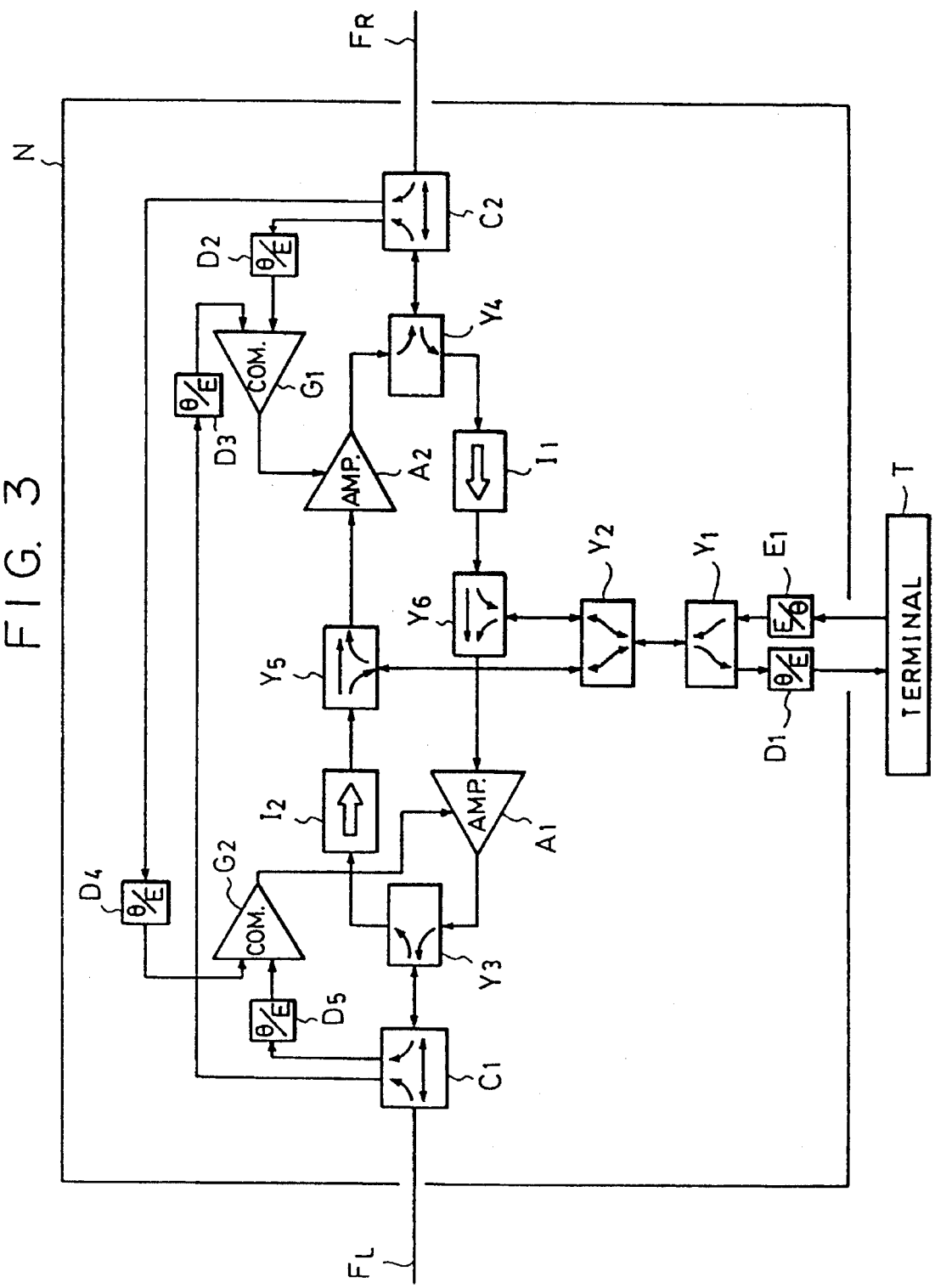
FIG. 3 is a view showing a structure of an optical node used in the first embodiment of FIG. 2A.

FIG. 3 shows the construction of each optical node $N_1$–$N_i$ in the bus-type optical communication network shown in FIG. 2A. There are provided an electro-optical (E/O) converter E, for converting an electric signal from a terminal N into an optical signal, opto-electrical (O/E) converters $D_1, \ldots, D_5$ for converting an optical signal into an electric signal, couplers or branching/combining devices $Y_1, \ldots Y_6$ for branching an optical signal to two optical signals or combining two optical signals to a single one, directional couplers $C_1$ and $C_2$ for picking out part (e.g., 1/10) of each of optical signals propagating in opposite directions, optical amplifiers $A_1$ and $A_2$ for amplifying an optical signal as it is without converting it to an electric signal, optical isolators for transmitting an optical signal solely in one direction, comparators $G_1$ and $G_2$ for discriminating the magnitudes of two input electric signals to control gains of the optical amplifiers $A_1$ and $A_2$ accordingly, and optical fiber transmission paths $F_L$ and $F_R$.

As the E/O converter $E_1$, a semiconductor laser (LD), a light emitting device (LED) or the like can be used. As the O/E converter, a PIN photodiode (PIN-PD), an avalanche photodiode (APD) or the like can be employed. As the optical amplifier $A_1, A_2$, a semiconductor optical amplifier, a fiber optical amplifier or the like can preferably be applied thereto. Further, as the coupler $Y_1$–$Y_6$, a fiber-fusion type of optical coupler or the like can be used, and as the directional coupler $C_1, C_2$, a waveguide type of optical coupler can be utilized.

The operation of the optical node N of this embodiment will be explained.

In FIG. 3, when the terminal T is not in a transmission state, the optical node N operates as follows.

When the optical signal from another terminal is transmitted to the optical fiber transmission path $F_L$, this optical signal reaches the coupler $Y_3$ through the directional coupler $C_1$. At this time, part (e.g., 1/10) of the signal is picked out by the directional coupler $C_1$ and then converted into an electric signal by the O/E converter $D_3$ to be input into one of the input terminals of the comparator $G_1$. The optical signal reaching the coupler $Y_3$ transmits through the isolator $I_2$ and is branched by the coupler $Y_5$ into two signals. One of the signals is input into the optical amplifier $A_2$, while the other signal is input into the O/E converter $D_1$ through the couplers $Y_2$ and $Y_1$ to be converted into an electric signal and then transmitted to the terminal T. The optical signal reaching the optical amplifier $A_2$ is amplified thereby, and is transmitted to the optical fiber transmission path $F_R$ through the coupler $Y_4$ and the directional coupler $C_2$. At this time, part of the optical signal is picked out by the directional coupler $C_2$ and converted into an electric signal by the O/E converter $D_2$ to be input into one of two terminals of the comparator $G_1$. The comparator $G_1$ compares intensities of the electric signals from the O/E converters $D_2$ and $D_3$, and when the intensity from the converter $D_2$ is larger than that from the converter $D_3$, the comparator $G_1$ decreases the gain of the optical amplifier $A_2$. The comparator $G_1$ increases such gain when the reverse holds true. The gain of the optical amplifier $A_2$, where such as a semiconductor optical amplifier is used, can electrically be controlled by changing its injection current. In such manner, the gain of the optical amplifier $A_2$ in the optical node N is controlled such that the intensity of the optical signal incident from the optical fiber transmission path $F_L$ is always made equal to that transmitted to the optical fiber transmission path $F_R$.

Where the signal is incident from the optical fiber transmission path $F_R$, the signal transmits through the directional coupler $C_2$, the coupler $Y_4$, the isolator $I_1$, and the coupler $Y_6$, and then is amplified by the optical amplifier $A_1$ to be sent out to the optical fiber transmission path $F_L$ through the coupler $Y_3$ and the directional coupler $C_1$. Also in this case, the gain of the optical amplifier $A_1$ is controlled such that input and output intensities are made equal to each other by the comparator $G_2$ by comparing the intensities of signals which are respectively picked out by the directional couplers $C_2$ and $C_1$ and converted into electric signals by the O/E converters $D_4$ and $D_5$.

On the other hand, when the terminal T is in the transmission state, the gains of the optical amplifiers $A_1$ and $A_2$ are so determined that their outputs amount to respective predetermined values. Thus, the amplifiers $A_1$ and $A_2$ are not controlled by the comparators $G_1$ and $G_2$. This operation is done. e.g., by controlling the optical amplifiers $A_1$ and $A_2$ in response to signals from a controller or the like provided in the terminal T.

The signal from the terminal T is converted into an optical signal by the E/O converter $E_1$, transmits through the coupler $Y_1$, $Y_2$, $Y_5$ and $Y_6$, and is amplified by the optical amplifiers $A_1$ and $A_2$ to a predetermined output level. Then, the amplified signals are respectively transmitted to the optical fiber transmission paths $F_L$ and $F_R$ through the couplers $Y_3$ and $Y_4$ and the directional couplers $C_1$ and $C_2$. At this time, the couplers $Y_5$ and $Y_6$, in general, branch the optical signal from the coupler $Y_2$ also in directions opposite to directions bound for the amplifiers $A_1$ and $A_2$, so that the isolators $I_1$ and $I_2$ are used so as not to send those branched unwanted signals out to the optical fiber transmission paths.

Next, referring to FIGS. 2A and 2B, an entire operation of the optical communication network of this embodiment will be described. First, consider a case where the terminal $T_1$ transmits a signal. The signal from the terminal $T_1$ is converted into an optical signal by the optical node $N_1$ and transmitted to the optical fiber transmission paths $F_1$ and $F_2$. At this time, the gains of the optical amplifiers $A_1$ and $A_2$ contained in the optical node $N_1$ are controlled such that a predetermined optical output $P_o$ can be obtained as explained above. This output is indicated by $P_o$ in FIG. 2B. The optical signal transmitted to the transmission path $F_1$ is absorbed at the end equipment $S_1$. On the other hand, the optical signal transmitted to the optical fiber transmission path $F_2$ is attenuated by such an attenuation amount as is determined by the length of the optical fiber $F_2$, and reaches the optical node $N_2$. Therein, part of the optical signal is branched to be transmitted to the terminal $T_2$, and the remaining is, as explained above, amplified to an intensity equal to the intensity of the light input to the optical node $N_2$ and is transmitted to the optical fiber transmission path $F_3$. As shown by the line $L_1$ of FIG. 2B, this signal is absorbed by the end equipment $S_2$, after passing through all the other optical nodes $N_3$–$N_i$ with the same process being repeated. The intensity of the optical signal at this end is indicated by $P_1$ in FIG. 2B. Since the intensity of the optical signal is kept unchanged in each optical node, the difference between $P_o$ and $P_1$, namely, a total loss amount of the optical signal output from the optical node $N_1$ is determined by a total extension distance of the optical fiber transmission paths $F_2$–$F_{i+1}$.

Next consider a case where a signal is transmitted from the terminal $T_3$. As shown by the line $L_2$ of FIG. 2B, the signal converted into an optical signal by the optical node $N_3$ is transmitted in opposite directions to both of the transmission paths $F_3$ and $F_4$. These signals pass through all the optical nodes (i.e., the signal sent out in the left direction passes through the optical nodes $N_2$ and $N_1$, and the signal sent out in the right direction passes through the optical nodes $N_4$–$N_i$) with the above-mentioned process being repeated, and thereafter, they are absorbed by the end equipment $S_1$ and $S_2$, respectively. The intensity of the optical signal transmitted from the optical node $N_3$ is $P_o$, and the loss amount of the optical signal is determined by the length of the optical fiber as mentioned above (the total length of the optical fibers $F_3$, $F_2$ and $F_1$ in a case where the signal is transmitted in the leftward direction, while the total length of the optical fibers $F_4$–$F_{i+1}$ in a case where the signal is transmitted in the rightward direction). So, intensities of these signals would never be less than $P_1$.

The cases where the signals are transmitted from the terminals $T_1$ and $T_3$ have been explained above, but cases where signals are transmitted from other terminals are the same. In this network, the intensity of the optical signal output From the original optical node is all $P_o$, and the transmitted optical signal would never be weakened less than $P_1$. Here, although the signal transmitted from the terminal $T_i$ is also attenuated when reaching the end equipment $S_1$, the signal light would never be less than $P_1$, assuming that the length of $F_{i+1}$ is made longer than that of $F_1$ in this case. Further, the loss amount of a signal light depends only on the length of the optical fibers measured from the node from which the signal is transmitted, but is independent from the number and positions of the optical nodes. Therefore, even if the positions and the number of the terminals are changed, there is no need to re-set the optical signal gains and so forth of the optical nodes. Thus, such a network is realized in which the terminals can flexibly be re-connected.

Although a maximum transmission distance of this network is determined by the loss in the optical fiber, the loss in the optical fiber would not become a problem in the optical communication network according to this invention because the total distance could not be made too long due to the signal transmission delay in the bus-type optical communication network as mentioned above.

Figure 4:
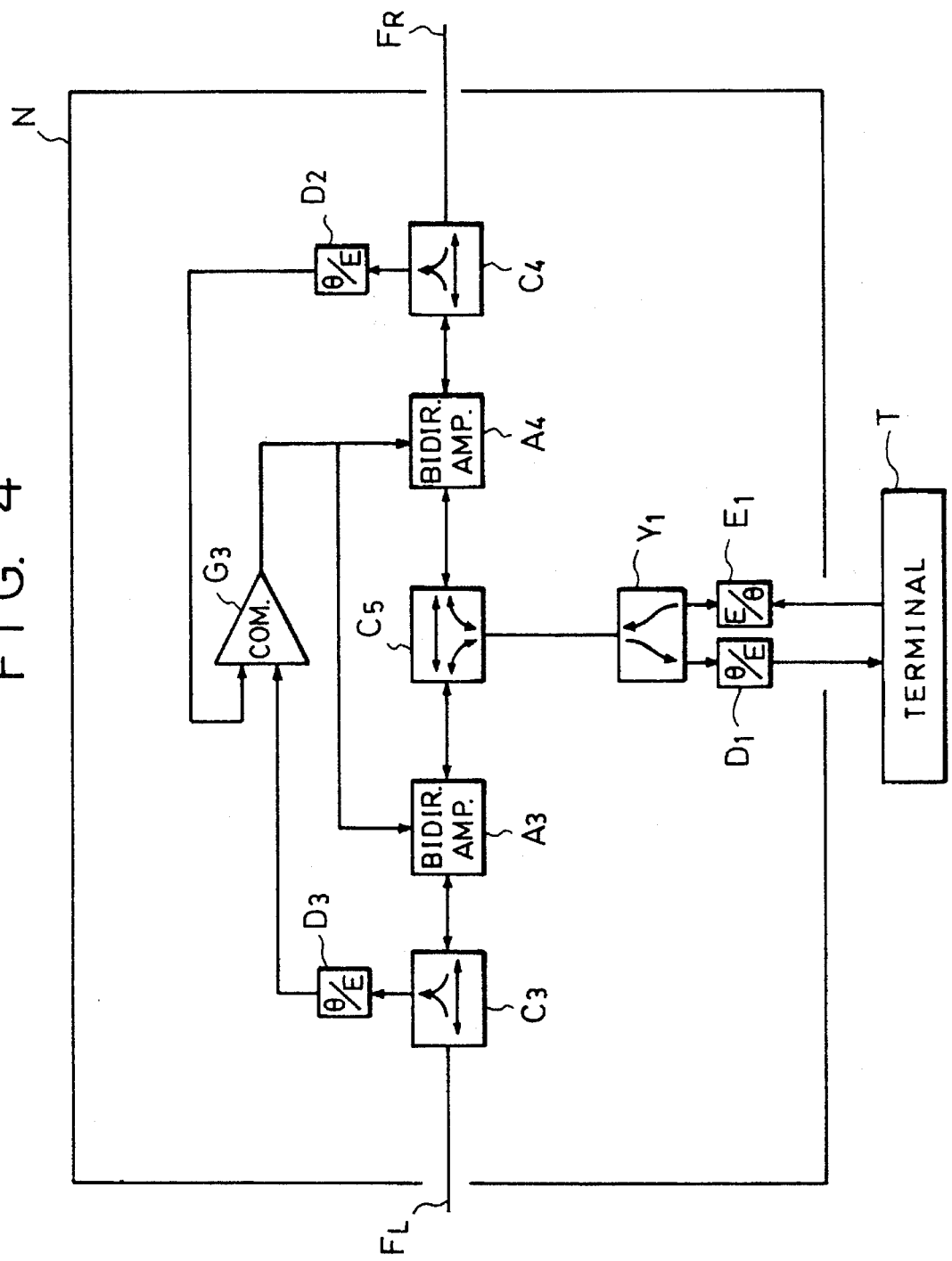
FIG. 4 is a view showing a structure of an optical node in a second embodiment according to the present invention.

FIG. 4 shows the structure of an optical node of a second embodiment. In the second embodiment, the same optical communication network as shown in FIG. 2A is utilized. In FIG. 4, there are provided bidirectional optical amplifiers $A_3$ and $A_4$ in which there is no distinction between output and input terminals. Semiconductor optical amplifiers or the like can preferably be employed for effecting the amplification of optical communication signals in opposite directions. Further, there are provided couplers $C_3$ and $C_4$ for picking out part (e.g., 1/10) of a transmitted signal. The same reference numerals as those in FIG. 3 designate the same members or means as those in FIG. 4.

In the first embodiment, the signal light from the other optical nodes incident from the optical fiber transmission paths $F_R$ and $F_L$ is branched by the coupler, and the signal lights travelling in opposite directions are separately amplified. In contrast, in the second embodiment, since those optical amplifiers $A_3$ and $A_4$ which are capable of bidirectional amplifications are used, the signal lights propagating in opposite directions are amplified by a common optical amplifier without branching or combining them. Namely, the couplers $Y_2$, $Y_3$ and $Y_4$ in the first embodiment are not used in the second embodiment. The gain of each bidirectional optical amplifier $A_3$, $A_4$ can be made approximately equal with respect to both directions, so that the optical node having the same function as that shown in FIG. 3 can be achieved by such a structure as shown in FIG. 4.

The remaining operation is substantially the same as that of the first embodiment.

Figure 5:
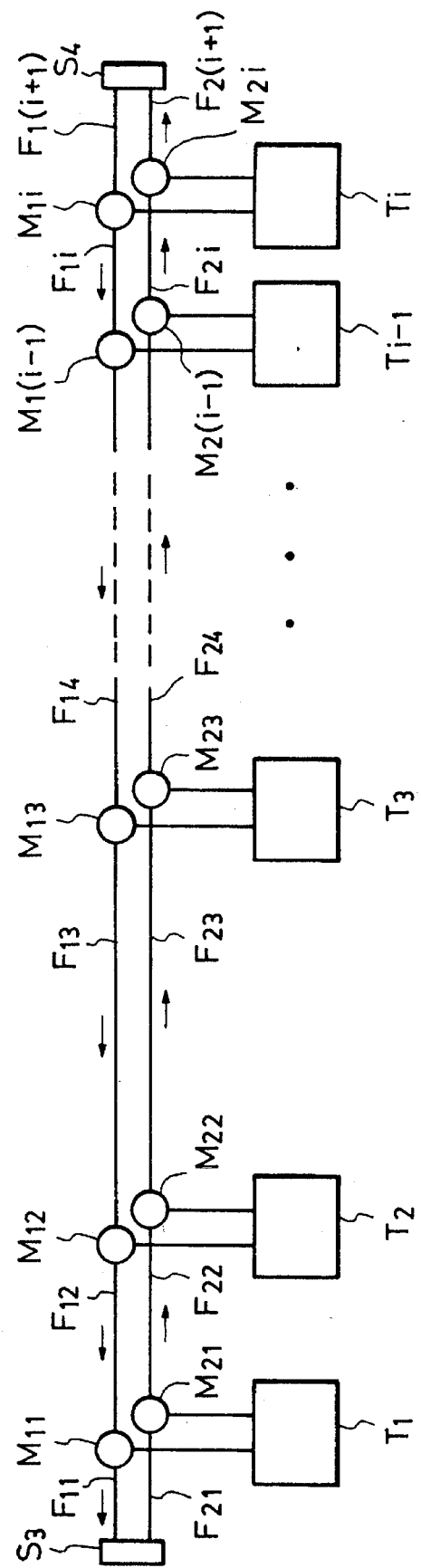
FIG. 5 is a view showing a structure of a third embodiment according to the present invention.
Figure 6:
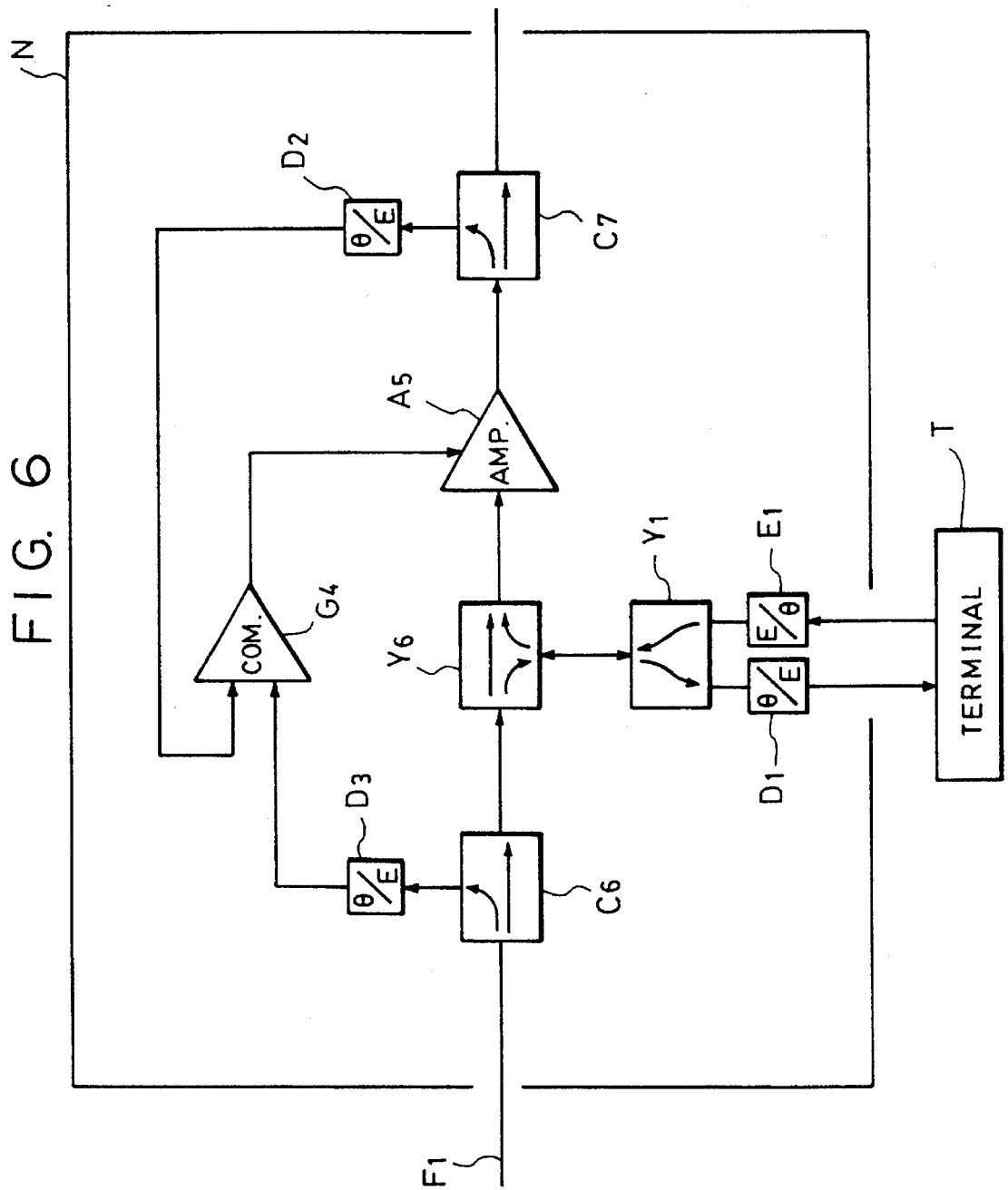
FIG. 6 is a view showing a structure of an optical node in the third embodiment of FIG. 5.

Referring now to FIGS. 5 and 6, a third embodiment of the present invention is shown. In FIG. 5 showing the optical communication network of the third embodiment, there are provided terminals $T_1, \ldots, T_i$, optical fiber transmission paths $F_{11}, F_{21}, \ldots, F_{1\ (i+1)}, F_2(i+1)$, optical nodes $M_{11}, M_{21}, \ldots, M_{1i}, M_{2i}$, and end equipment $S_3$ and $S_4$. Each optical node converts a signal from the terminal into an optical signal and transmits tills optical signal to the optical fiber transmission path, converts a signal on the optical fiber transmission path into an electric signal and transmits this electric signal to the terminal, and acts as a repeater by amplifying the signal on the optical fiber transmission path.

FIG. 6 shows the structure of each optical node $M_{1i}$, $M_{2i}$, ..., shown in FIG. 5. The same reference numerals as those in FIG. 3 indicate the same members or means as those in FIG. 3. It is noted, however, that directional couplers $C_6$ and $C_7$ operate solely in one direction. Further, it should be noted that the optical node as shown in FIG. 6 is used without any modifications as the optical nodes designated by $M_{21}, \ldots, M_{2i}$ in FIG. 5, and that the optical node turned around with respect to right and left sides from that of FIG. 6 is used as the optical nodes designated by $M_{11}, \ldots, M_{1i}$ in FIG. 5.

While in the first and second embodiments the present invention is applied to such an optical communication network in which signals on the optical fiber are transmitted in opposite directions, in the third embodiment such a bus-type network is attained wherein there are used a pair of optical fiber transmission paths each of which transmits a signal in a single direction. Also in the third embodiment of such a structure, the optical node having the same function as that in the first and second embodiments can be used for composing an optical communication network which obtains the same operation and advantages as mentioned above.

While in the above embodiments each terminal, contains a single light emitting device or E/O converter, the present invention can apply also to an optical communication network in which each terminal includes a plurality of light emitting devices for emitting lights of different wavelengths or a tunable light emitting device whose wavelength is changeable for performing a wavelength division multiplexing communication. In this case, each optical node contains plural optical amplifiers, plural comparators, and so forth for respective signal lights of different wavelengths, and a wavelength multiplexer and a de-multiplexer need be disposed at an output port and an input port of the optical node, respectively.

Further, the light emitting device, the light receiving device (O/E converter), the optical converter, etc., are respectively semiconductor devices such as a semiconductor laser, a PIN photodiode, a semiconductor optical amplifier, etc., in the above-discussed embodiments, but they are not limited to semiconductor devices. Different, kinds devices can also be applied so far as they have the same functions, respectively.

While optical fibers are used as an optical transmission path, the present invention is also applicable to optical communication networks other than the optical fiber communication system.

Moreover, while in the structure of the optical node as shown in FIG. 3, a signal light propagating From the coupler $Y_3$ to the coupler $Y_4$ is transmitted through the isolator $I_2$, the coupler $Y_5$ and the optical amplifier $A_2$ in this order, this order need not be obeyed. For example, the order of the optical coupler $Y_5$ and the optical amplifier $A_2$ may be changed. This is true likewise as to the structures shown in FIGS. 4 and 6. Any type of optical node can be utilized in an optical communication network or system of the present invention so long as the optical node functions in the same manner as discussed above.

The end equipment $S_1$, $S_2$, $S_3$, $S_4$ may be replaced by other means such as a gateway for connecting this optical communication system to another network.

According to the present invention, there is provided a means for amplifying an optical signal in such a manner that the intensity of light input to an optical node which contains this amplifying means becomes equal to that of light output from this optical node. So, even if the configuration of connection of optical nodes is changed in the network, the power of an optical signal would not saturate nor run short at any optical nodes. Thus, an optical communication network or system, typically a bus-type one, is achieved in which optical nodes can be flexibly re-connected without any disadvantages.

While there has been shown and described what are considered preferred embodiments of the present inventions, it will be obvious to those skilled in the art that various changes and modifications may be made therein without departing from the invention as defined by the claims.

What is claimed is:

1. An optical communication network comprising:

at least one optical transmission path;

a plurality of terminals connected to said optical transmission path; and a plurality of optical nodes provided along said optical transmission path, said optical nodes each comprising optical branching means for outputting a first part of an optical signal input from said optical transmission path to one of said terminals and outputting a second part of the optical signal to said optical transmission path, optical combining means for combining a light beam transmitted from one of said terminals with the second part of the optical signal output to said optical transmission path, an optical amplifying device for amplifying the second part of the optical signal output to said optical transmission path as it is without converting it to an electric signal, and controlling means for controlling a gain of said optical amplifying device so as to equalize an intensity of an optical signal input to each said optical node with an intensity of an optical signal output from each said optical node, wherein said controlling means includes a comparator, and when said one terminal is in a non-transmission state said optical amplifying device is controlled by said comparator.

2. An optical communication network according to claim 1, wherein each said optical node further comprises first monitoring means for monitoring the intensity of the optical signal input to said optical node and outputting a first signal, second monitoring means for monitoring the intensity of the optical signal output from said optical node and outputting a second signal, and comparing means for comparing the first and second signals and outputting a control signal, with said controlling means controlling the gain of said optical amplifying device in accordance with the control signal output from said comparing means.

3. An optical node to be used in an optical communication network having at least one optical transmission path and a plurality of terminals connected to the optical transmission path, comprising:

optical branching means for outputting a first part of an optical signal input from the optical transmission path to one of the terminals and outputting a second part of the optical signal to the optical transmission path;

optical combining means for combining light transmitted from one of the terminals with the second part of the optical signal output to the optical transmission path;

an optical amplifying device for amplifying the second part of the optical signal output to the optical transmission path as it is without converting it to an electric signal; and controlling means for controlling a gain of said optical amplifying device so as to equalize an intensity of an optical signal input to said optical node with an intensity of an optical signal output from each optical node, wherein said controlling means includes a comparator, and when the one terminal is in a non-transmission state said optical amplifying device is controlled by said comparator.

4. An optical node according to claim 3, further comprising first monitoring means for monitoring the intensity of the optical signal input to said optical node and outputting a first signal, second monitoring means for monitoring the intensity of the signal output from said optical node and outputting a second signal, and comparing means for comparing the first and second signals and outputting a control signal, said control means controlling the gain of said optical amplifying device in accordance with the control signal output from said comparing means.

5. A communication method in an optical communication network comprising at least one optical transmission path, a plurality of terminals connected to the optical transmission path, and a plurality of optical nodes provided along the optical transmission path, the method comprising the steps of:

outputting a first path of an optical signal input from the optical transmission path to one of the terminals;

outputting a second part of the optical signal along the optical transmission path;

combining light transmitted from one of the terminals with the second part of the optical signal output to the optical transmission path;

amplifying the second part of the optical signal output to the optical transmission path as it is without converting it to an electric signal;

controlling a gain in the amplification of the optical signal so as to equalize an intensity of the optical signal input to one of the optical nodes with an intensity of an optical signal output from one of the optical nodes; and when the one terminal is in a non-transmission state, controlling the gain in the amplification of the optical signal with a comparator.

6. An optical communication network according to claim 1, wherein when said one terminal is in a transmission state, said optical amplifying device is controlled by said one terminal.

7. An optical communication network according to claim 3, wherein when the one terminal is in a transmission state, said optical amplifying device is controlled by the one terminal.

8. A communication method according to claim 5, further comprising the step of, when the one terminal is in a transmission state, controlling the gain in the amplification of the optical system with the one terminal.

* * * * *

UNITED STATES PATENT AND TRADEMARK OFFICE
CERTIFICATE OF CORRECTION

PATENT NO. : 5,502,589
DATED : March 26, 1996
INVENTOR(S) : Yamamoto et al.

It is certified that error appears in the above-indentified patent and that said Letters Patent is hereby corrected as shown below:

[57] ABSTRACT:

Line 13, "modes" should read --nodes--.

COLUMN 4:

Line 3, "5," should read --6,--.
Line 20, "E," should read --$E_1$--.

COLUMN 7:

Line 23, "tills" should read --this--.
Line 28, "$M_{11}$" should read --$M_{11}$,--.

Signed and Sealed this

Twentieth Day of August, 1996

Attest:

BRUCE LEHMAN

Attesting Officer           Commissioner of Patents and Trademarks